(12) United States Patent
Gouji

(10) Patent No.: US 12,416,973 B2
(45) Date of Patent: Sep. 16, 2025

(54) INFORMATION PROCESSING APPARATUS AND INFORMATION PROCESSING METHOD

(71) Applicant: CANON KABUSHIKI KAISHA, Tokyo (JP)

(72) Inventor: Kazunori Gouji, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/902,260

(22) Filed: Sep. 30, 2024

(65) Prior Publication Data

US 2025/0110553 A1  Apr. 3, 2025

(30) Foreign Application Priority Data

Oct. 3, 2023   (JP) .................................. 2023-172005

(51) Int. Cl.
*G06F 3/01* (2006.01)

(52) U.S. Cl.
CPC .................................... *G06F 3/013* (2013.01)

(58) Field of Classification Search
CPC ................................ G06F 3/011; G06F 3/013
See application file for complete search history.

(56) References Cited

U.S. PATENT DOCUMENTS

| 10,768,693 | B2 | 9/2020 | Powderley et al. |
| 10,976,836 | B2 | 4/2021 | Nishizawa |
| 2012/0026166 | A1* | 2/2012 | Takeda .................. A63F 13/211 345/419 |
| 2012/0231883 | A1* | 9/2012 | Hayashi .................. A63F 13/20 463/31 |
| 2016/0007007 | A1* | 1/2016 | Nevet .................. G06V 40/172 726/19 |
| 2017/0358139 | A1* | 12/2017 | Balan .................... G02B 27/017 |
| 2018/0307303 | A1* | 10/2018 | Powderly ................ G06F 3/017 |
| 2018/0314346 | A1* | 11/2018 | Kirmani ................ G06F 3/0346 |
| 2019/0227642 | A1* | 7/2019 | Nishizawa .............. G06F 3/014 |
| 2022/0026981 | A1* | 1/2022 | Fukumoto ............. A63F 13/212 |
| 2023/0114113 | A1* | 4/2023 | Kumar .................... G06F 3/013 345/156 |
| 2023/0236674 | A1* | 7/2023 | Morikawa ............. G06F 3/0346 345/157 |
| 2024/0134460 | A1* | 4/2024 | Millar ..................... G06T 13/40 |
| 2025/0032206 | A1* | 1/2025 | Mahoney ............... A61B 34/37 |

FOREIGN PATENT DOCUMENTS

| JP | 2017027206 A | 2/2017 |
| JP | 2019128693 A | 8/2019 |
| JP | 2020519986 A | 7/2020 |
| JP | 2023108779 A | 8/2023 |
| WO | 2017191701 A1 | 11/2017 |

\* cited by examiner

*Primary Examiner* — Ryan A Lubit
(74) *Attorney, Agent, or Firm* — Canon U.S.A., Inc. IP Division

(57) ABSTRACT

Provided is an information processing apparatus that executes first setting processing for setting a first region within a virtual space based on a line-of-sight of a user viewing the virtual space, and second setting processing for setting a position within the virtual space based on an attitude of the user. In the second setting processing, after the first region is set in the first setting processing, a position to be set is limited within the first region.

14 Claims, 10 Drawing Sheets

INFORMATION PROCESSING APPARATUS AND INFORMATION PROCESSING METHOD

BACKGROUND

Technical Field

The present disclosure relates to an information processing apparatus and an information processing method.

Description of the Related Art

In a system of a cross-reality (XR), which allows a user to bodily sense a virtual reality and a mixed reality, a hand controller is used to convert a movement of a hand of the user into an action in a virtual space when a display on a head-mounted display (HMD) is controlled. The HMD is a spectacle type device which the user wears on his/her head, and includes a small display.

In the Japanese translation of PCT Application No. 2020-519986, a method of selecting an operation start position of an object in a virtual space, based on line-of-sight information of a user and operating the object using a hand controller, is proposed.

In Japanese Patent Application Publication No. 2017-027206, a method of drawing a selected virtual object nearer so as to increase a display size thereof, thereby allowing easier operation of the selected virtual object is proposed.

However, in a case of the technique disclosed in the Japanese translation of PCT Application No. 2020-519986, a position and an attitude of a hand controller are detected so as to operate the object, hence the user has to maintain the position and attitude of his/her hand to operate a specific object, which imposes a heavy burden on the user.

In the case of the technique disclosed in Japanese Patent Application Publication No. 2017-027206, only the selected virtual object is displayed in a magnified state, hence the virtual object on the display screen is changed, and the state of the other virtual objects cannot be confirmed while operation on the selected virtual object is being performed.

SUMMARY

Some embodiments of the present disclosure reduce the burden on the user with regard to operation in an information processing apparatus, in which the user can perform operation in a virtual space based on the attitude information of the user.

According to an aspect of the present disclosure, an information processing apparatus includes a processor and a memory storing instructions that, when executed by the processor, cause the information processing apparatus to execute first setting processing for setting a first region within a virtual space based on a line-of-sight of a user viewing the virtual space, and execute second setting processing for setting a position within the virtual space based on an attitude of the user, wherein in the second setting processing, after the first region is set in the first setting processing, a position to be set is limited within the first region.

Further features of various embodiments of the present disclosure will become apparent from the following description of exemplary embodiments with reference to the attached drawings.

DESCRIPTION OF THE EMBODIMENTS

Example embodiments of the present disclosure will now be described in detail, with reference to the accompanying drawings.

Embodiment 1

Figure 1:
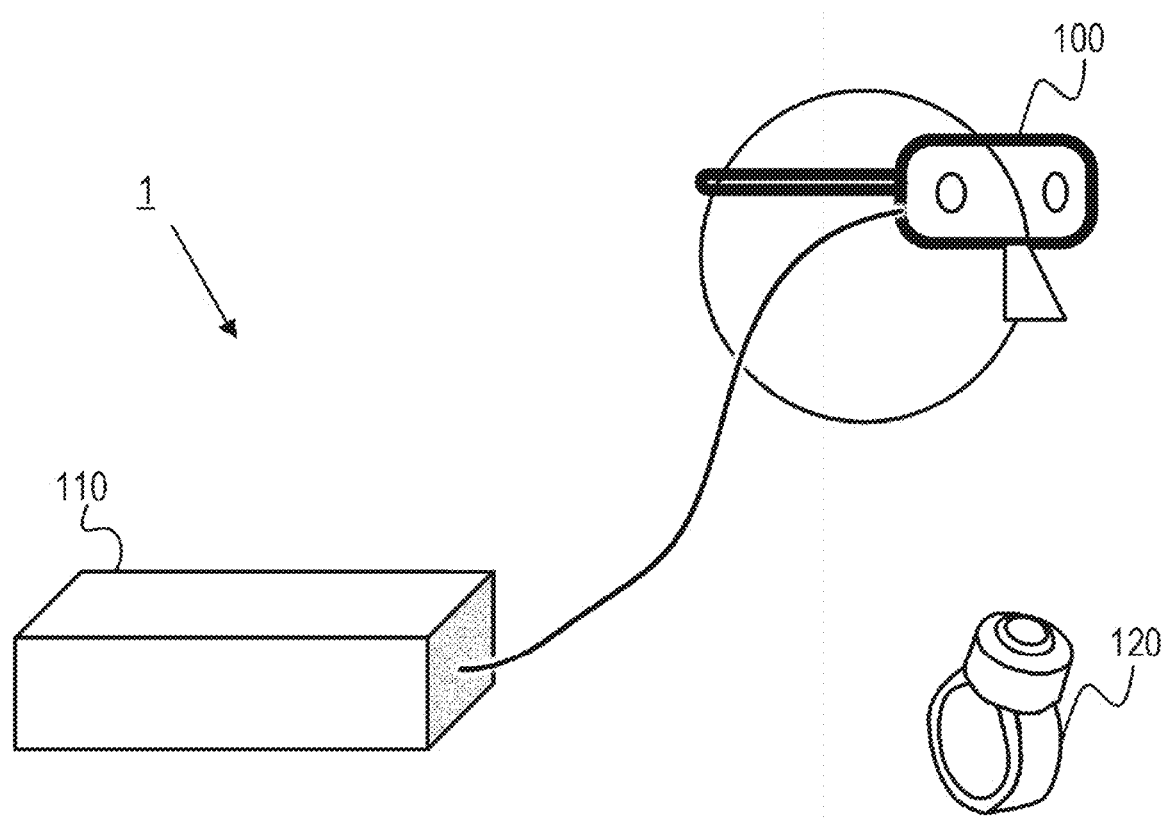
FIG. 1 is a diagram for describing an information processing system according to Embodiment 1.

An information processing system 1 according to Embodiment 1 will be described with reference to FIG. 1. The information processing system 1 is an information processing apparatus that includes an HMD 100, an image processing device 110, and a controller 120.

The HMD 100 is a head-mounted display, which is a head-mount type display device (electronic device) mountable on the head of the user. The HMD 100 is a video see-through type HMD, on which a composite image combining a captured image, which is an image of the range in front of the user captured by the HMD 100, and such contents as computer graphics (CG), in accordance with the attitude of the HMD 100, is displayed.

The image processing device 110 is a control device (image processing apparatus; electronic device) that controls the HMD 100. The image processing device 110 is, for example, a smartphone, a tablet terminal, or a personal computer (PC). The image processing device 110 is connected with the HMD 100 wirelessly or via a cable. The image processing device 110 combines a captured image acquired from the HMD 100 and computer graphics (CG) so as to generate a composite image of a virtual space, and sends the composite image to the HMD 100. Each composing element of the image processing device 110 may be included in the HMD 100.

The controller 120 is a device for performing various controls of the HMD 100. When the user operates the controller 120, the image processing device 110 controls the HMD 100 in accordance with the operation performed by the user. The controller 120 is, for example, a ring type hand controller that can be worn on a finger of a user, as illustrated in FIG. 1. If the controller 120 is wearable on the finger of the user, the user can freely move their hand while holding the controller 120. The controller 120 also has a button enclosing an optical trackpad (hereafter called OTP), that can detect a moving distance on a plane. The controller 120 performs wireless communication with the image processing device 110.

The user causes the HMD 100 to display a menu, including a pointer, by lengthy pressing of the button, for example.

Then the user touches their finger on the OTP and slides their finger in an arbitrary direction, whereby the pointer can be placed on a desired item. Then the user can determine the selection of this item by pushing the button down. The shape of the controller 120 here is a ring shape, but the shape is not limited to a ring shape.

For example, the shape of the controller 120 may be a glove type hand controller that is wearable on their hand. Thus, the controller 120 may be holdable by the hand of the user, or wearable on the hand of the user, so that the user can easily operate.

Internal Configuration of HMD

Figure 2:
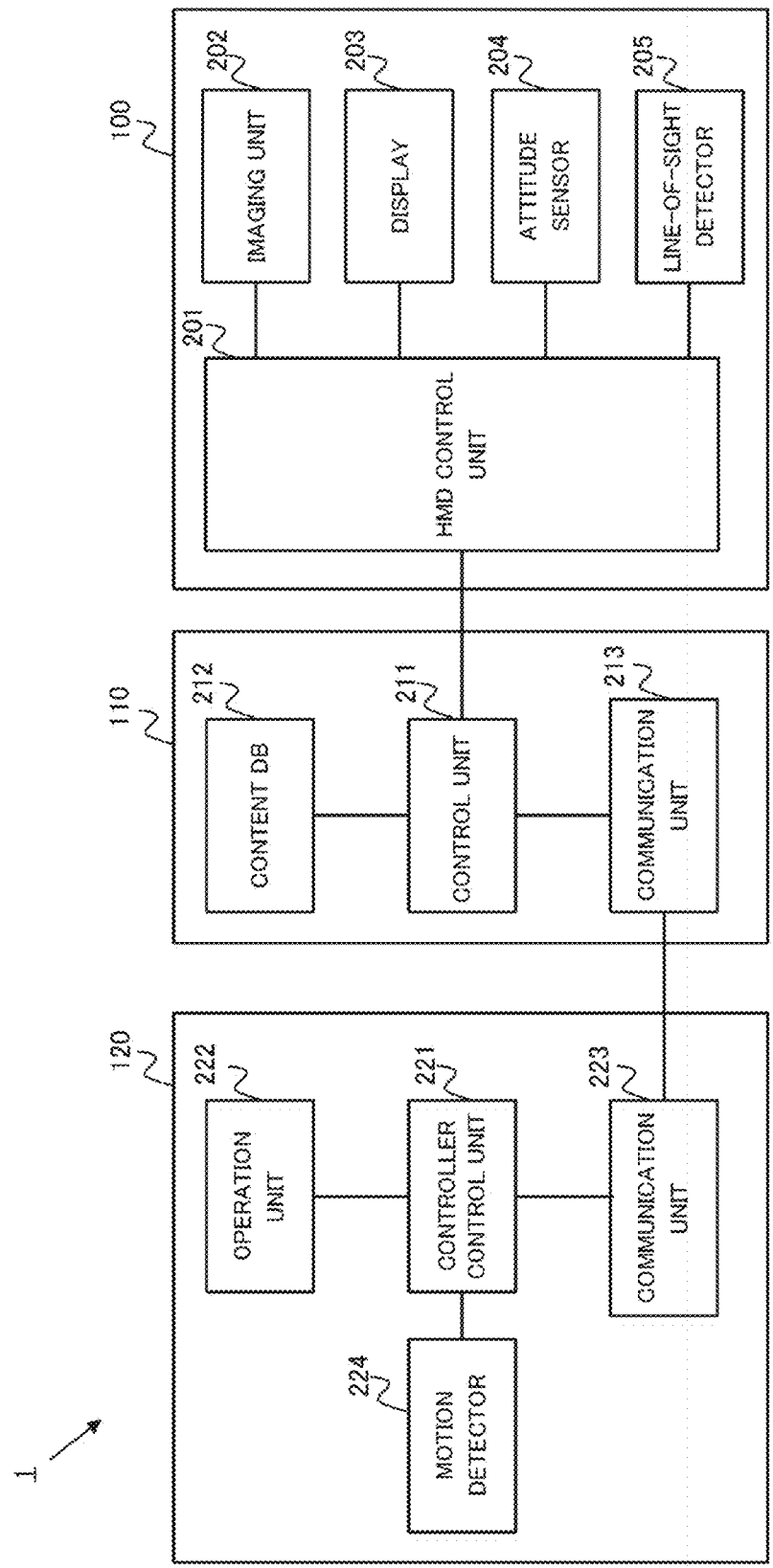
FIG. 2 is a diagram for describing an internal configuration of an HMD and the like according to Embodiment 1.

Internal configuration of the HMD 100 will be described with reference to FIG. 2. The HMD 100 includes an HMD control unit 201, an imaging unit 202, a display 203, an attitude sensor 204, and a line-of-sight detector 205.

The HMD control unit 201 controls each composing element of the HMD 100. When a composite image (image generated by combining a captured image, when the imaging unit 202 captured a space in front of the user, and a CG), is acquired from the image processing device 110, the HMD control unit 201 displays the composite image on the display 203, which is the display means.

Therefore by wearing the HMD 100, the user can view the composite image displayed on the display 203. The user can experience various mixed realities as if a CG were actually integrated with a real space.

The imaging unit 202 includes two cameras (imaging device; imaging means). The two cameras are disposed near the positions of the left and right eyes of the user respectively, in a state where the user wears the HMD 100, so as to capture the same space as the space the user is viewing without wearing the HMD. The images (captured images), generated by the two cameras imaging a subject (range in front of the user), are outputted to the image processing device 110. The two cameras of the imaging unit 202 can also acquire the information on the distances from the two cameras to the subject, as the distance information, based on the distance measurement by the stereo camera.

The display 203 displays the composite image. The display 203 includes liquid display panels or organic EL panels, for example. In a state of the user wearing the HMD 100, images corresponding to the left and right eyes of the user are displayed respectively.

For the display 203, a device using a semi-transmission type half mirror may also be used. For example, the display 203 may display an image as if a CG were directly superimposed on a real space, which is seen transmitting through the half mirror. In this case, the HMD 100 is called an optical see-through type HMD (not a video see-through type HMD). Further, the display 203 may display only an image of a complete virtual space, without using the captured image of the real space (or the real space itself). In the present embodiment, "virtual space" refers not only to a complete virtual space, such as a virtual reality (VR), but also to a virtual space where a real space is mixed, such as a mixed reality (MR).

The attitude sensor 204 detects an attitude and a position of the HMD 100. The attitude sensor 204 includes an inertial measurement unit (IMU), for example. The attitude sensor 204 outputs the information on the attitude of the HMD 100 to the image processing device 110 as attitude information.

The line-of-sight detector 205 is a line-of-sight detector for detecting line-of-sight information of the user wearing the HMD 100. The line-of-sight detector 205 includes an imaging unit (e.g., camera) installed in the HMD 100, for example. The line-of-sight detector 205 images an eye of the user using the imaging means and analyzes the captured image to detect the line-of-sight.

Internal Configuration of Image Processing Device

Internal configuration of the image processing device 110 will be described with reference to FIG. 2. The image processing device 110 includes a control unit 211, a content DB 212, and a communication unit 213.

The control unit 211 receives, from the HMD 100, an image (captured image) acquired by the imaging unit 202 of the HMD 100, attitude information acquired by the attitude sensor 204, and line-of-sight information acquired by the line-of-sight detector 205. Then the control unit 211 combines the captured image and an arbitrary CG, and generates a composite image to be displayed on the HMD 100 thereby. The control unit 211 can also interpret instructions from the user based on the line-of-sight information.

The control unit 211 sends the composite image to the HMD control unit 201 of the HMD 100. Further, based on the information (distance information and attitude information) acquired by the HMD 100, the control unit 211 controls the position, direction, and size of the CG in the composite image. For example, in a case where a virtual object indicated by the CG is disposed near a specific object, which exists in a real space, in the virtual space expressed by the composite image, the control unit 211 increases the size of the virtual object (CG) as the distance between the specific object and the imaging unit 202 is shorter. By controlling the position, the direction and the size of the CG like this, the control unit 211 can generate a composite image as if the object of the CG, which is not disposed in the real space, were actually disposed in the real space.

The content DB 212 is a storage unit to store information on CGs and the like. The control unit 211 can select a CG that is read from the content DB 212 (that is, a CG used for generating a composite image).

Internal Configuration of Controller

Internal configuration of the controller 120 will be described with reference to FIG. 2. The controller 120 includes a controller control unit 221, an operation unit 222, a communication unit 223, and a motion detector 224.

The controller control unit 221 controls each composing element of the controller 120.

The operation unit 222 includes a button enclosing an OTP. Information (operation information) on operation at the operation unit 222, such as pressing the OTP and sliding a finger, is sent to the image processing device 110 via the communication unit 223.

For example, the user can move a pointer displayed on the HMD 100 to a predetermined position by sliding a finger on the OTP. Further, the user can instruct a specific processing to the HMD 100 and the image processing device 110 by pressing the button at the OTP. Thus, the user can control the HMD 100 by a combination of sliding a finger on and pressing a button at the OTP. Specifically, the user causes the HMD 100 to display a menu by lengthy pressing of the button at the OTP, placing the pointer at a desired position, and pushing the button at the OTP down, whereby this position can be selected. The operation unit 222 may include any operation member instead of the OTP, as long as the user can perform operation by physical contact with the operation member. For example, the operation unit 222 may include any one of: a touchpad, a touch panel, a cross-key, a joystick, and a trackpad device, instead of the OTP.

The communication unit 223 performs wireless communication with the image processing device 110 (communication unit 213).

The motion detector 224 includes an inertial measurement unit (IMU: inertial sensor) that can detect inertial information (spatial moving distance and angle) of the controller 120. The motion detector 224 may include any device as long as the device does not obstruct downsizing of the controller 120, and can detect the inertial information (such information as displacement, speed and acceleration).

As described above, the imaging unit 202 of the HMD 100 is line-of-sight detection means for detecting the line-of-sight information of the user. The motion detector 224 of the controller 120 is attitude detection means for detecting the attitude information of the user. The image processing device 110 is an image processing unit to generate an image of the virtual space based on the line-of-sight information and the attitude information.

The processing according to Embodiment 1 will be described with reference to the flow chart in FIG. 3 and FIGS. 4 to 7.

Figure 4:
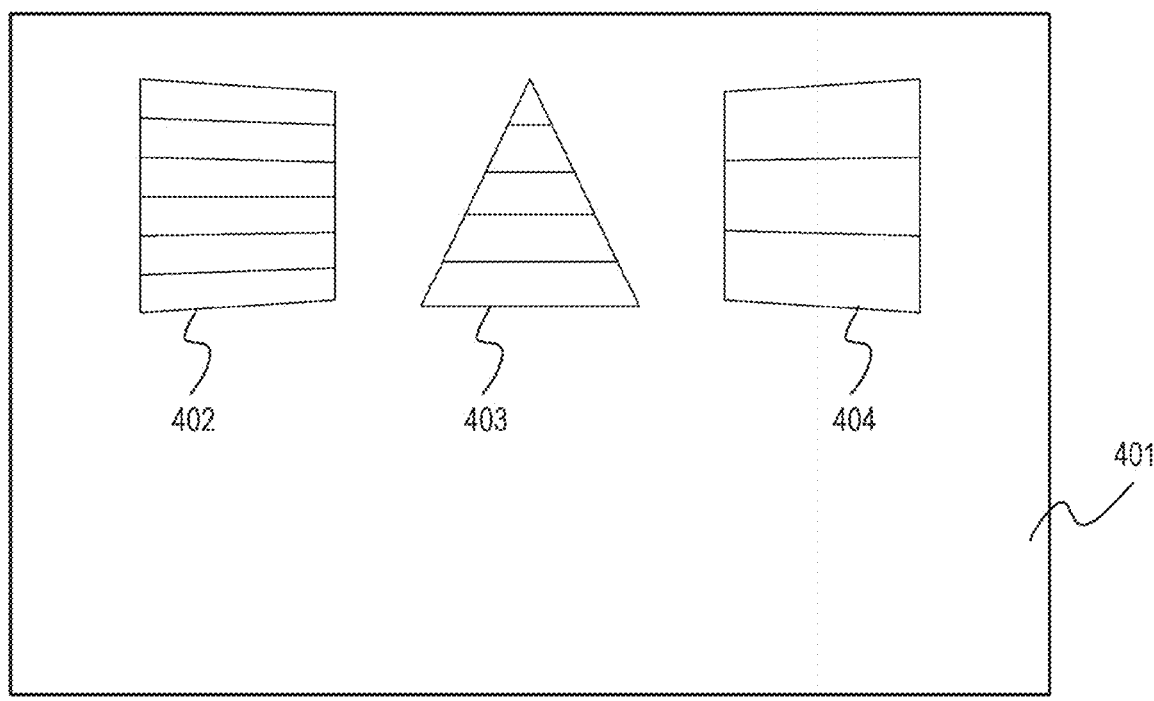
FIG. 4 is a diagram illustrating one display example of the HMD according to Embodiment 1.

When the operation is started, the control unit 211 causes the display 203 to display a plurality of virtual objects, 402, 403 and 404, in an image display region 401, as illustrated in FIG. 4. The control unit 211 generates the virtual objects 402 to 404 based on information stored in the content DB 212. When any one of the displayed virtual objects is selected by the user, the control unit 211 generates a state where more detailed items can be selected (selection state) for this virtual object. Here the control unit 211 may combine the image captured by the imaging unit 202 and the virtual objects, and display the composite image.

Figure 5:
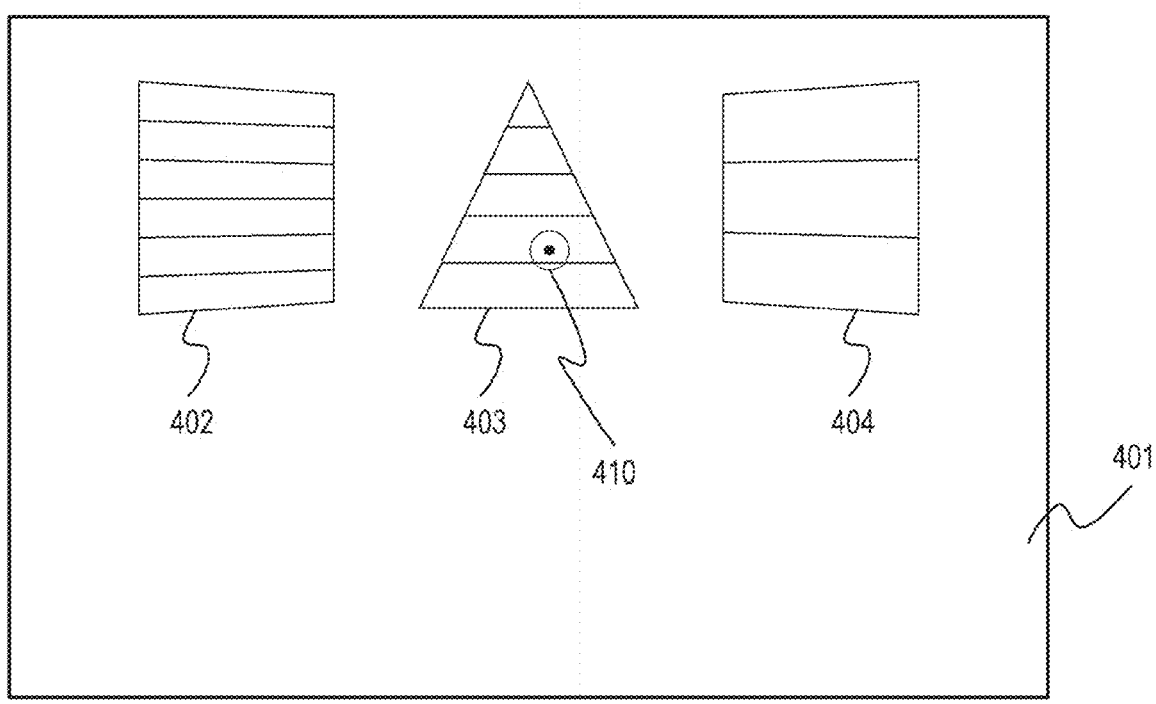
FIG. 5 is a diagram illustrating one display example of the HMD according to Embodiment 1.

In step S1001, the control unit 211 detects a line-of-sight of the user wearing the HMD 100, based on the line-of-sight information detected by the line-of-sight detector 205. The control unit 211 calculates the intersection between the line-of-sight and a virtual object disposed in the virtual space, sets (determines) the line-of-sight position of the user in the virtual space, and displays a line-of-sight cursor on the virtual object. The line-of-sight cursor is an image to indicate a position of an operation target of the user. FIG. 5 is an example where the line-of-sight cursor 410 is displayed on the virtual object 403. The line-of-sight cursor 410 has an outer frame and a center point, and in a stage where the line-of-sight is detected, the control unit 211 displays the outer frame of the line-of-sight cursor 410 by a solid-line. The configuration of the image of the line-of-sight cursor is not limited to this example.

In step S1002, the control unit 211 determines whether there is a position at which the user is gazing in the virtual space. For example, in a case where a state of the line-of-sight position of the user in a virtual space, which is set based on the line-of-sight information detected by the line-of-sight detector 205, remains in a predetermined range in the virtual space for a predetermined time, the control unit 211 determines that there is a position at which the user is gazing in this range. The control unit 211 sets the position, at which the user is gazing in the virtual space, as a gazing position. In a case where a virtual object exists at a gazing position, the control unit 211 determines that the user is gazing at this virtual object. If it is determined that there is a gazing position in the virtual space, the control unit 211 executes the processing in step S1003, and if not, the control unit 211 returns to the processing in step S1001, and repeats the line-of-sight detection processing.

In step S1003, the control unit 211 sets an operable range (first region) in the virtual space based on the gazing position of the user. The control unit 211 detects a virtual object existing at the gazing position of the user, and sets the region where the virtual object exists as the operable range based on the shape information of the virtual object. Therefore, the image processing device 110 includes first setting means for setting a first region in the virtual space based on the line-of-sight of the user viewing the virtual space, and a selection means for selecting an object disposed in the virtual space based on the line-of-sight of the user. In FIG. 5, for example, the control unit 211 sets a region, where the virtual object 403 exists at the gazing position, indicated by the cursor 410, as the operable range. Here the entire region, where the virtual object 403 exists, may be set as the operable range, or only around the gazing position of the user, out of the region where the virtual object 403 exists, may be set at the operable range.

Figure 6:
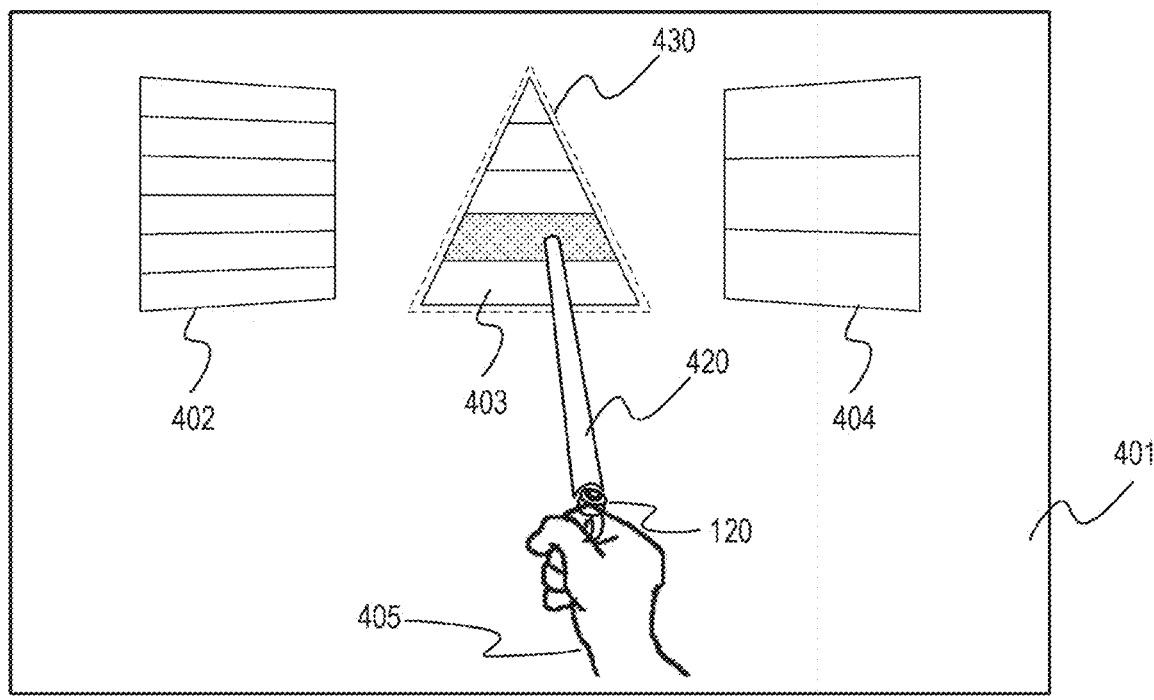
FIG. 6 is a diagram illustrating one display example of the HMD according to Embodiment 1.

In step S1004, the control unit 211 displays a ray to indicate a virtual object. The ray is an image to indicate a position of an operation target of the user in the virtual space, and is displayed as an image of a beam, for example. The user can specify a position in the virtual space using the attitude of their hand or finger. Based on the attitude information detected by the controller 120, which is attitude detection means worn on the hand 405 of the user, the control unit 211 sets a specified position in the virtual space which the user specifies using attitude. Therefore, the image processing device 110 includes second setting means for setting a position in the virtual space based on the attitude of the user. In Embodiment 1, the specified position is set based on the attitude of the controller 120, which is a hand controller. Then the control unit 211 sets a position of the tip of the ray, and a position, length direction and the like of the ray, based on the specified position. FIG. 6 indicates a display example of the ray. Here a ray 420 is displayed from the controller 120 worn on the hand 405 of the user into the region where the virtual object 403 exists.

The control unit 211 sets the initial position of the tip of the ray as a predetermined position in the operable range. In Embodiment 1, the operable range is set in a region where a virtual object determined as being gazed at exists, hence the control unit 211 sets the initial position of the tip of the ray to a predetermined position, such as the center or upper end of the virtual object being gazed at. The initial position of the tip of the ray is not limited to this, and may be a position predetermined for each virtual object, for example.

Further, the control unit 211 limits the movement of the tip position of the ray within the operable range which was set in step S1003. In the case of the example in FIG. 6, the control unit 211 limits the movement of the tip position of the ray so as to be movable only within the region where the virtual object 403, determined as being gazed at, exists. Therefore the image processing device 110 includes the second setting means and after the first region (operable range) is set in the virtual space based on the line-of-sight of the user, the second setting means limits the position, to be set in the virtual space based on the attitude of the user, within the first region. Specifically, it is assumed that the specified position by the user in the virtual space, which is set based on the attitude information detected by the controller 120, is moved out of the operable range after the operable range is set in step S1003. In this case, the control unit 211 sets the limit position, which is a position limited within the operable range, and generates an image so that the image (tip of the ray), indicating the position of the operation target of the user, is displayed at the limit position. On the other hand, in a case where the specified position by the user in the virtual space, which is set based on the attitude information detected by the controller 120, is within the operable range, the control unit 211 generates the image (tip of the ray) indicating the position of the operation target of the user, so that this image is displayed at the specified position.

Further, the control unit 211 generates the image of the virtual space so that the image indicating the operable range is displayed. In the case of the example in FIG. 6, an operable range 430 is displayed as a dotted-line frame image around the virtual object 403 determined as being gazed at. By displaying the image indicating the operable range, the user can recognize that a position, to which the tip of the ray 420 can be moved using the controller 120, is limited within the operable range.

Furthermore, after setting the operable range in step S1003, the control unit 211 generates an image of the virtual space, such that the information to indicate the line-of-sight position (line-of-sight cursor), which was set based on the line-of-sight information detected by the line-of-sight detector 205, is not displayed. In the case of the example in FIG. 6, the line-of-sight cursor 410 displayed in FIG. 5 is hidden.

In step S1005, the control unit 211 detects the line-of-sight information of the user using the line-of-sight detector 205.

In step S1006, the control unit 211 determines whether or not the line-of-sight position of the user in the virtual space, which was set, based on the line-of-sight information of the user detected in step S1005, is outside the operable range. If it is determined that the line-of-sight position of the user is outside the operable range (step S1006: YES), the control unit 211 executes the processing in step S1007. If it is determined that the line-of-sight position of the user is within the operable range (step S1006: NO), the control unit 211 executes the processing in step S1008.

Figure 7:
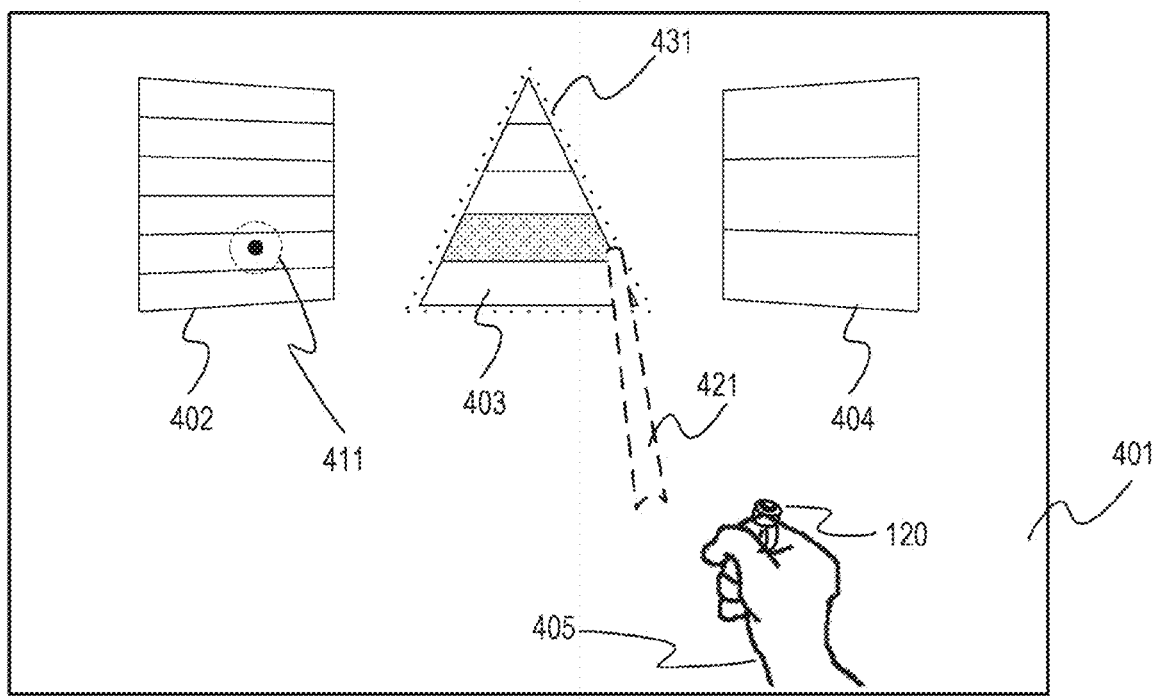
FIG. 7 is a diagram illustrating one display example of the HMD according to Embodiment 1.

In step S1007, the control unit 211 displays the line-of-sight cursor again, which was hidden in step S1004. FIG. 7 indicates a display example in a case where the line-of-sight position is moved out of the operable range after setting the operable range, and moved onto the virtual object 402. As illustrated in FIG. 7, the line-of-sight cursor, which was hidden in FIG. 6, is displayed as the line-of-sight cursor 411 in FIG. 7. The control unit 211 may differentiate between the line-of-sight cursor which is displayed in the case where the line-of-sight position of the user is moved out of the operable range after setting the operable range, and the line-of-sight cursor which is displayed in a state where the operable range is not set. In the case of the example in FIG. 7, the line-of-sight cursor 411 is an image constituted of a dotted-line outer frame and a center point, which is different from the line-of-sight cursor 410 in FIG. 5, constituted of a solid-line outer frame and a center point. By displaying the line-of-sight cursors in different forms like this, the user can be notified when the line-of-sight position is moved out of the operable range after setting the operable range.

In step S1008, the control unit 211 maintains the state where the line-of-sight cursor was hidden in step S1004.

In step S1009, the control unit 211 sets the display of the image (ray) indicating the position of the operation target of the user in the virtual space, based on the position information and attitude information of the controller 120, and the operable range. The control unit 211 controls the display of the image (ray) indicating the position of the operation target of the user in the virtual space, depending on whether the specified position in the virtual space determined by the attitude of the user, which was set based on the attitude information of the controller 120, is outside the operable range. Specifically, in the case where the specified position determined by the attitude of the user is within the operable range, the control unit 211 displays the tip of the ray at the specified position, and in the case where the specified position is outside the operable range, the control unit 211 displays the tip of the ray at the limit position which is limited within the operable range. The limit position is, for example, a position closest to the specified position on the boundary line of the operable range. Thereby, even if the user performs an operation with which the tip of the ray deviated from the operable range using the controller 120, the tip position of the ray in the display does not move out of the boundary of the operable range. The state where the tip of the ray is displayed at the limit position while the specified position is moved out of the operable range is called the "limit state".

In step S1010, the control unit 211 determines whether the tip position of the ray is in the limit state. The control unit 211 executes the processing in step S1011 if it is determined that the tip position is in the limit state, and executes the processing in step S1012 if not.

In step S1011, the control unit 211 switches the display of the operable range to an alert display. In the case of the example in FIG. 7, the image indicating the operable range 431 is an image of the dotted-line frame, which is different from the image indicating the operable range 430 that is not in the limited state, illustrated in FIG. 6. The tip position of the ray 421 is displayed within the operable range 431, but the start point of the ray 421 is displayed at a position distant from the controller 120. The control unit 211 also differentiates the image indicating the ray in the limited state from the image indicating the ray not in the limit state. In the case of the example in FIG. 7, the ray 421 in the limit state is displayed as a broken line, which is different from the ray 420 in the normal state (not in the limit state), illustrated in FIG. 6. By differentiating the image indicating the operable range and the image of the ray between the case where the specified position moved out of the operable range and the case where the specified position is within the operable range, after setting the operable range like this, the user can be notified when the specified position moved out of the operable range.

Figure 8:
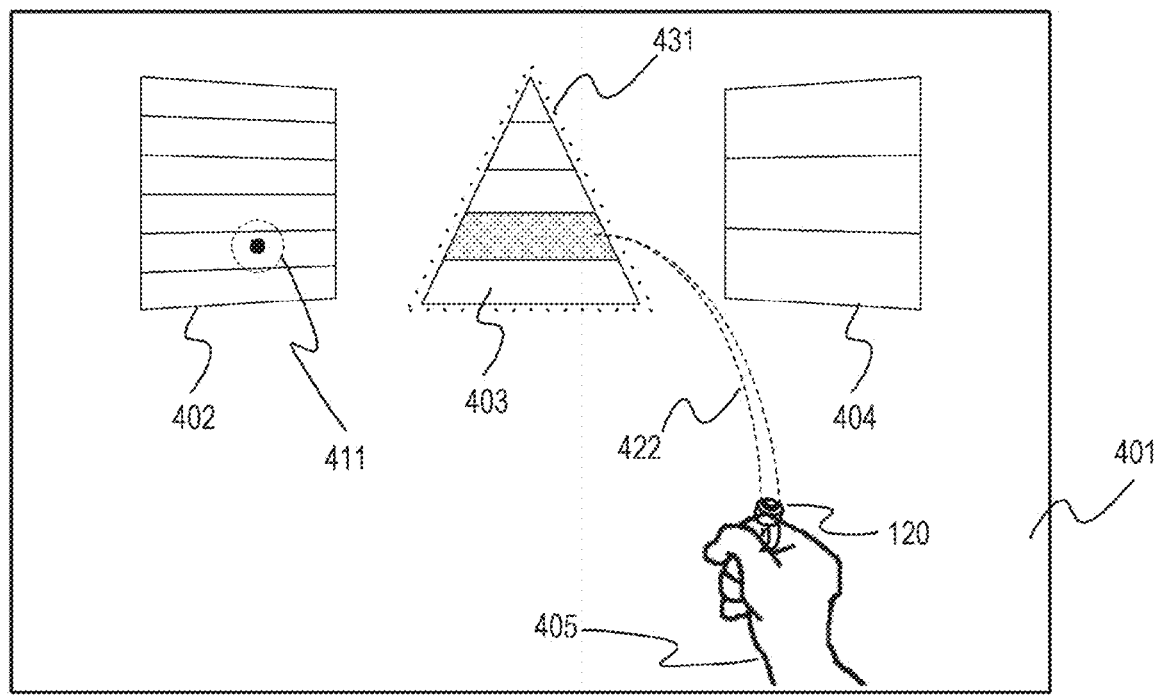
FIG. 8 is a diagram illustrating one display example of the HMD according to Embodiment 1.

The method of displaying the ray in the limit state is not limited to this. For example, as illustrated in FIG. 8, a ray 422 may be displayed as a curve, setting the position of the start point of the ray to the controller 120.

In step S1012, the control unit 211 switches the display of the operable range to normal display. For example, the operable range 430 illustrated in FIG. 6 is displayed.

In step S1013, the control unit 211 determines whether the state where the line-of-sight position of the user is outside the operable range (condition A) and the specified position of the user is outside the operable range (condition B) continued for a specified time. Condition B can be interpreted as a condition where the tip position of the ray is in the limit state. The determination method for the condition A is the same as the determination method in step S1006. The determination method for the condition B is the same as the determination method in step S1010. The control unit 211 executes the processing in step S1014 if it is determined that the condition A and the condition B have continued for a predetermined time, or returns to step S1005 and repeats the processing if not.

In step S1014, the control unit 211 cancels the operable range that was set in step S1003, and generates an image of the virtual space where the image (tip of the ray), indicating the position of the operation target of the user, is displayed at the specified position based on the attitude of the user. In Embodiment 1, the control unit 211 hides the operable range 430 and the ray 420 illustrated in FIG. 6, and displays the line-of-sight cursor 410 illustrated in FIG. 5. Thereby the image illustrated in FIG. 5 is displayed.

According to Embodiment 1, after the virtual object 403 is selected, the operation range using the controller 120 can be limited to the operable range that is set in a region where the virtual object 403 exists. Therefore, the user need not perform the operation using the controller 120 to maintain the tip position of the ray within the range where the virtual object to be operated exists. As a consequence, the burden on the user can be reduced.

In the example described in Embodiment 1, the virtual object existing at the gazing position of the user is selected, and the operable range is set based on the selected virtual object, but the method for setting the operable range is not limited to this. For example, a predetermined range, centered around the gaze position of the user, may be set as the operable range. Further, the method for setting the operable range based on the virtual object is not limited to the method for setting the range where this virtual object exists as the operable range, as mentioned above. For example, a range including a predetermined range around the region where the virtual object exists may be set as the operable range, or a part of the region where the vertical object exists may be set as the operable range.

Modification 1

Figure 3:
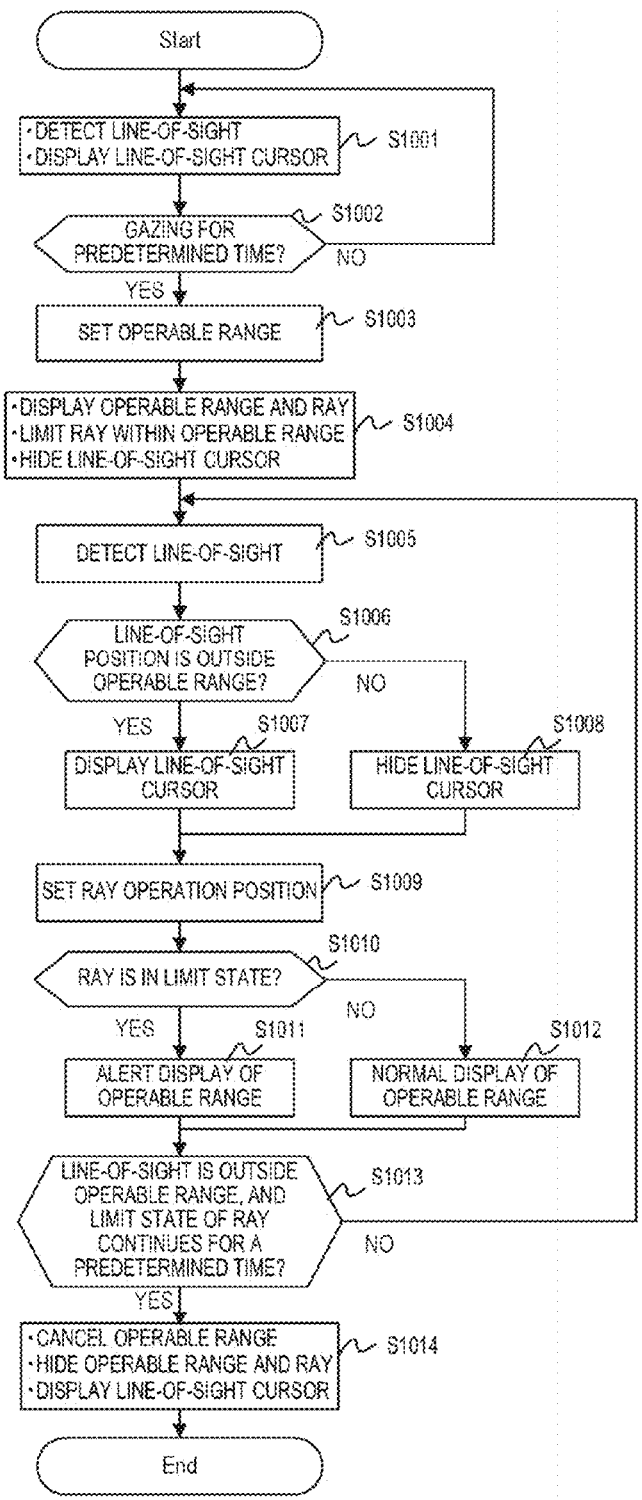
FIG. 3 is a flow chart of processing according to Embodiment 1.

In Modification 1, an example in a case of changing the condition of determining the gaze in step S1002 in FIG. 3 will be described. In Embodiment 1, in the case where the line-of-sight position of the user in the virtual space, that is set based on the line-of-sight information detected by the line-of-sight detector 205, exists in a predetermined range for a predetermined time, it is determined that the user is gazing at a gaze position within this range. Further, in a case where the line-of-sight position of the user is in the range where a certain virtual object exists for a predetermined time, it is determined that the user is gazing at the virtual object. In Modification 1, in a case where the specified position determined by the user, that is set based on the attitude information detected by the controller 120, exists in a predetermined range for a predetermined time, it is also determined that the user is gazing at a gaze position within this range. In other words, if a state, in which the line-of-sight position and the specified position are within a predetermined range in the virtual space, continues for a predetermined time, the control unit 211 of the image processing device 110 sets the gaze position in this range. Further, if a state, in which the line-of-sight position and the specified position of the user are within a range where a certain virtual object exists, continues for a predetermined time, the control unit 211 determines that the user is gazing at this virtual object.

Figure 9:
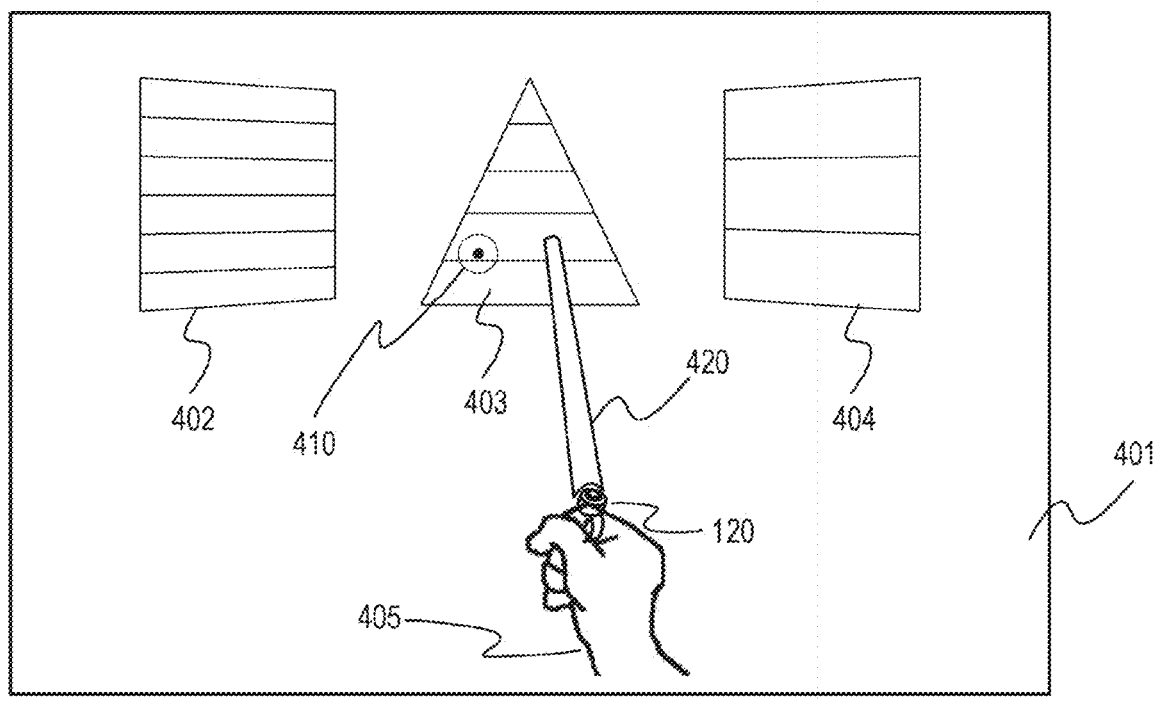
FIG. 9 is a diagram illustrating one display example of the HMD according to Modification 1.

In FIG. 9, in addition to the line-of-sight cursor 410 illustrated in FIG. 5, the ray 420 is displayed from the controller 120 toward the region in the virtual object 403. In the case where the state, in which the line-of-sight cursor 410 and the tip of the ray 420 exist on the virtual object 403, continues for a predetermined time, the control unit 211 determines the gaze at the virtual object 403, and executes the processing in step S1003. Here the predetermined time (determination threshold) may be set shorter than the case of Embodiment 1. In the case of performing this gaze determination, the control unit 211 displays the line-of-sight cursor 410 and the ray 420 in the image display region 401 at the point of step S1001.

The gaze may be determined based only on the attitude information detected by the controller 120, without using the line-of-sight information detected by the line-of-sight detector 205. In this case, the control unit 211 sets the specified position using the attitude of the user in the virtual space, based on the attitude information by the controller 120, and selects an object disposed in the virtual space based on the specified position. Then the control unit 211 sets the operable range in the virtual space based on the information on the selected object. In this case, the image processing device 110 includes second setting means for setting a position in the virtual space based on the attitude of the user viewing the virtual space, and selection means for selecting an object disposed in the virtual space based on the set position. The image processing device 110 further includes a third setting means for setting a region in the virtual space based on the information on this object. Just like Embodiment 1, the control unit 211 can set an operable range based on the shape information of the object. Further, after setting the operable range, the control unit 211 can limit the specified position, which is determined by the attitude of the user, to within the operable range. Furthermore, after setting the operable range, the control unit 211 can control such that the information to indicate the line-of-sight position of the user in the virtual space (line-of-sight cursor) is no longer displayed. In a case where the operable range is set and the line-of-sight of the user is moved out of the operable range thereafter, the control unit 211 can control such that the information to indicate the line-of-sight of the user in the virtual space (line-of-sight cursor) is displayed again. Further, in the case where the operable range is set and the line-of-sight of the user deviated from the operable range thereafter, the control unit 211 can notify the user of this state by changing the drawing form of the line-of-sight cursor, for example. Further, in a case where the operable range is set and the position in the virtual space specified by the attitude of the user is moved out of the operable range thereafter, this can be notified to the user by the control unit 211 by changing the image to indicate the operable range and the image of the ray, for example. Furthermore, in a case where the operable range is set and the specified position determined by the attitude of the user is outside the operable range thereafter, if the state, in which the line-of-sight of the user is outside the operable range, continues for a predetermined time thereafter, the control unit 211 can cancel the setting of the operable range. In a case where the specified position determined by the attitude of the user, which was set based on the attitude information detected by the controller 120, exists in a predetermined range for a predetermined time, the control unit 211 can determine that the user is gazing at the gaze position within this range. Further, in a case where the specified position determined by the attitude of the user maintains a certain state of being within the range where a certain virtual object exists for a predetermined time, the control unit 211 can determine that the user is gazing at this virtual object. Furthermore, in a case where the specified position determined by the attitude of the user is within a range where a certain virtual object exists, and the button included in the controller 120 is operated in this state, the control unit 211 can determine that the user is gazing at this virtual object.

Modification 2

In the examples described in Embodiment 1 and Modification 1, the display of the ray is controlled based on the position information and attitude information of the controller 120. In Modification 2, a method of detecting the hand of the user from the captured image and controlling the ray based on the information of the detected hand of the user will be described.

Figure 10:
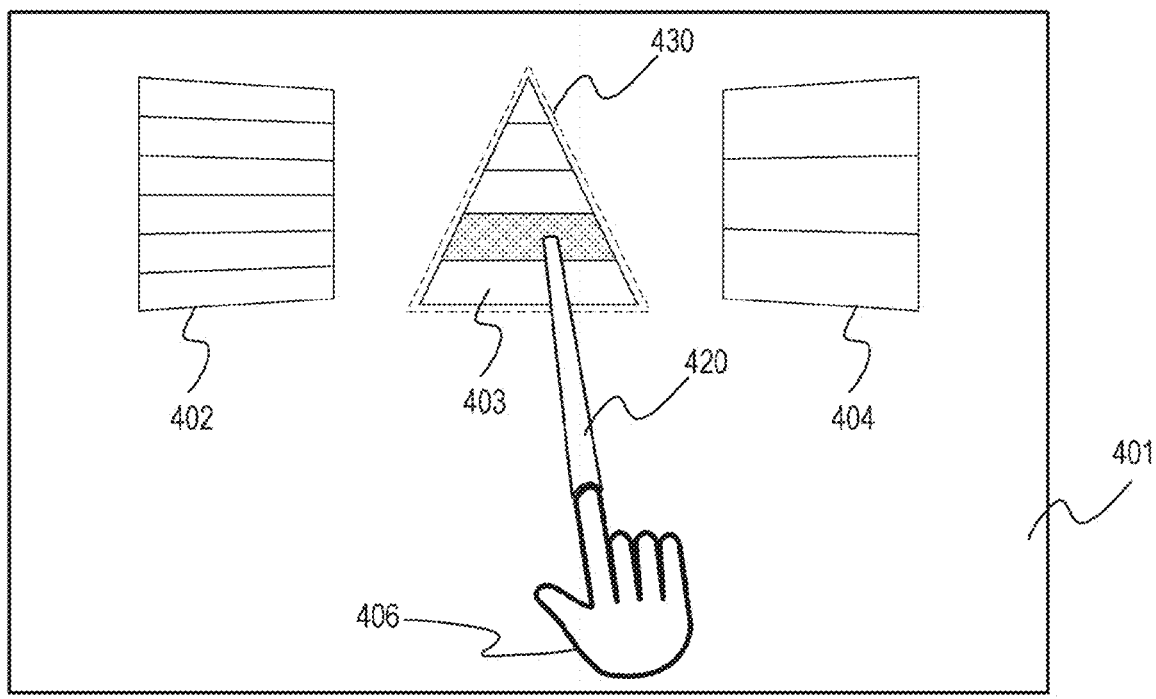
FIG. 10 is a diagram illustrating one display example of the HMD according to Modification 2.

In FIG. 10, a state where the ray 420 is displayed from the fingertip of the hand 406 of the user into the region of the virtual object 403 is illustrated. The control unit 211 detects the hand of the user from the image captured by the imaging unit 202, and acquires the position information and attitude information of the hand of the user. Then the control unit 211 sets the display position and direction of the ray based on the position information and attitude information of the hand of the user, and displays the ray 420 in the image display region 401.

The control of the ray 420 based on the position information and attitude information of the controller 120 described in Embodiment 1 and Modification 1 may be replaced with the control of the ray 420 based on the position information and attitude information of the hand 406 of the user.

While preferred embodiments of the present disclosure have been described, some embodiments are not limited to these embodiments, and the present disclosure may be modified and changed in various ways within the scope of the spirit thereof.

According to the present disclosure, the burden on the user for operation can be reduced in the information processing apparatus, in which the user can perform operation in a virtual space based on the attitude information of the user.

Note that the above-described various types of control may be processing that is carried out by one piece of hardware (e.g., processor or circuit), or otherwise. Processing may be shared among a plurality of pieces of hardware (e.g., a plurality of processors, a plurality of circuits, or a combination of one or more processors and one or more circuits), thereby carrying out the control of the entire device.

Also, the above processor is a processor in the broad sense, and includes general-purpose processors and dedicated processors. Examples of general-purpose processors include a central processing unit (CPU), a micro processing unit (MPU), a digital signal processor (DSP), and so forth. Examples of dedicated processors include a graphics processing unit (GPU), an application-specific integrated circuit (ASIC), a programmable logic device (PLD), and so forth. Examples of PLDs include a field-programmable gate array (FPGA), a complex programmable logic device (CPLD), and so forth.

The embodiment described above (including variation examples) is merely an example. Any configurations obtained by suitably modifying or changing some configurations of the embodiments within the scope of the subject matter of the present disclosure are also included in the present disclosure. The present disclosure also includes other configurations obtained by suitably combining various features of the embodiment.

Other Embodiments

Embodiment(s) of the present disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2023-172005, which was filed on Oct. 3, 2023 and which is hereby incorporated by reference herein in its entirety.

What is claimed is:

1. An information processing apparatus, comprising:
a processor; and
a memory storing instructions that, when executed by the processor, cause the information processing apparatus to:
execute first setting processing for setting a first region within a virtual space based on a line-of-sight of a user viewing the virtual space, and
execute second setting processing for setting a position within the virtual space based on an attitude of the user,
wherein in the second setting processing, after the first region is set in the first setting processing, a position to be set is limited within the first region.

2. The information processing apparatus according to claim 1, wherein
in the first setting processing, the first region is set within the virtual space in a case where the user gazes at a predetermined region for a predetermined time.

3. The information processing apparatus according to claim 1, wherein
the instructions, when executed by the processor, further cause the information processing apparatus to execute selection processing to select an object disposed in the virtual space based on the line-of-sight of the user, and
in the first setting processing, the first region is set based on information on the object.

4. The information processing apparatus according to claim 3, wherein
in the first setting processing, the first region is set based on information on a shape of the object.

5. The information processing apparatus according to claim 1, wherein the instructions, when executed by the processor, further cause the information processing apparatus not to display information indicating the position of the line-of-sight of the user within the virtual space after the first region is set in the first setting processing.

6. The information processing apparatus according to claim 5, wherein
the instructions, when executed by the processor, further cause the information processing apparatus to display the information indicating the position of the line-of-sight of the user within the virtual space again, in a case where the line-of-sight of the user is moved out of the first region after the first region is set in the first setting processing.

7. The information processing apparatus according to claim 1, wherein
the instructions, when executed by the processor, further cause the information processing apparatus, in a case where the line-of-sight of the user is moved out of the first region after the first region is set in the first setting processing, to notify the user of this state.

8. The information processing apparatus according to claim 1, wherein
the instructions, when executed by the processor, further cause the information processing apparatus, in a case where a position within the virtual space specified based on the attitude of the user is moved out of the first region after the first region is set in the first setting processing, to notify the user of this state.

9. The information processing apparatus according to claim 1, wherein
in a case where a state, in which a position within the virtual space specified based on the attitude of the user is outside the first region and the line-of-sight of the user is outside the first region, continues for a predetermined time after the first region is set in the first setting processing, setting of the first region is cancelled in the first setting processing.

10. The information processing apparatus according to claim 1, wherein
in a case where the first region is set in the first setting processing, the position is maintained on a boundary of the first region in the second setting processing, even though the user has an attitude based on which the position is to be set outside the first region.

11. The information processing apparatus according to claim 1, wherein
the instructions, when executed by the processor, further cause the information processing apparatus to execute acquisition processing to acquire the attitude of the user based on an attitude of a controller worn by the user or held by the user.

12. The information processing apparatus according to claim 1, wherein
the instructions, when executed by the processor, further cause the information processing apparatus to execute acquisition processing to acquire the attitude of the user from a captured image capturing a real space.

13. A control method for an information processing apparatus, comprising:
a first setting step of setting a first region within a virtual space based on a line-of-sight of a user viewing the virtual space; and
a second setting step of setting a position within the virtual space based on an attitude of the user, wherein
in the second setting step, after the first region is set in the first setting step, a position to be set is limited within the first region.

14. A non-transitory computer-readable storage medium storing computer-executable instructions that, when executed by a computer, cause the computer to execute a control method for an information processing apparatus, the control method comprising:
a first setting step of setting a first region within a virtual space based on a line-of-sight of a user viewing the virtual space; and
a second setting step of setting a position within the virtual space based on an attitude of the user, wherein
in the second setting step, after the first region is set in the first setting step, a position to be set is limited within the first region.

* * * * *